United States Patent [19]
McMaster

[11] 3,803,539
[45] Apr. 9, 1974

[54] METHOD AND APPARATUS FOR DETECTING MOTION

[75] Inventor: Richard L. McMaster, Rochester, N.Y.

[73] Assignee: Detection Systems Inc., Fairport, N.Y.

[22] Filed: July 20, 1972

[21] Appl. No.: 273,472

[52] U.S. Cl............... 340/1 R, 340/3 D, 340/258 A
[51] Int. Cl.......................... G01s 9/66, G08b 13/16
[58] Field of Search................ 340/3 D, 258 A, 1 R; 343/7.7

[56] References Cited
UNITED STATES PATENTS
3,525,976  8/1970  Wilcox et al...................... 340/1 R Primary Examiner—Richard A. Farley
Attorney, Agent, or Firm—Warren W. Kurz

[57] ABSTRACT

A unique signal injection technique is employed to stabilize the range and sensitivity of motion-detection devices of the Doppler type. A signal of substantially constant amplitude is algebraically added to the received signal prior to detection of the Doppler frequency to substantially eliminate the adverse effects on range and sensitivity produced by both null and excessively large signal conditions.

7 Claims, 5 Drawing Figures

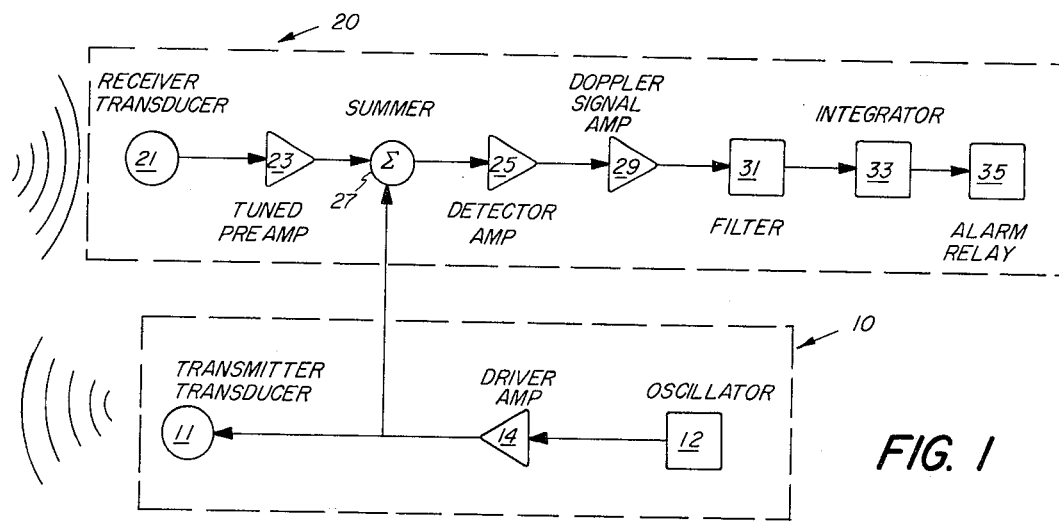
FIG. 1
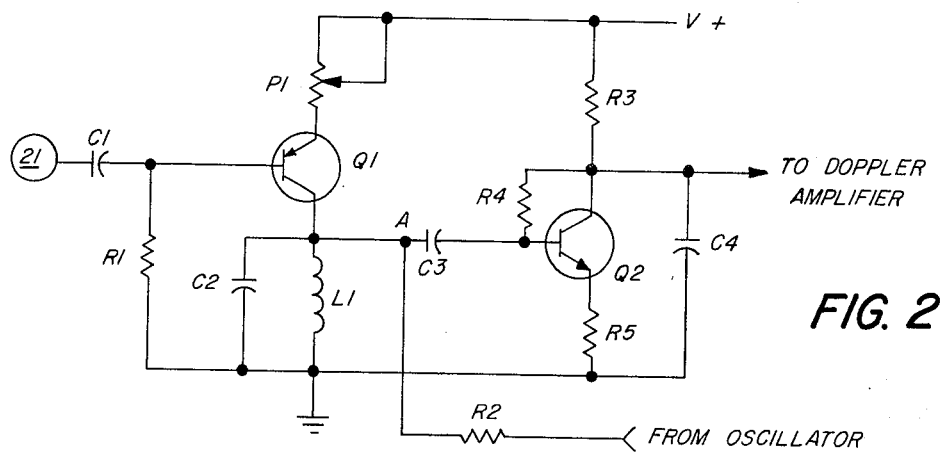
FIG. 2
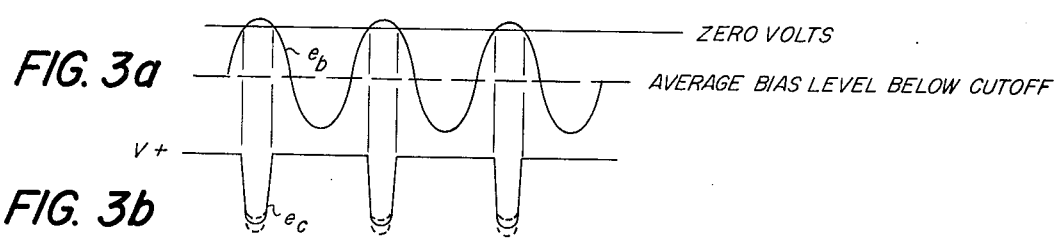
FIG. 3a
FIG. 3b
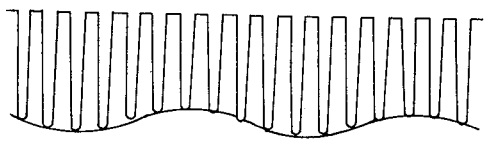
FIG. 3c

METHOD AND APPARATUS FOR DETECTING MOTION

BACKGROUND OF THE INVENTION

The present invention relates to improvements in electronic motion-detection devices of the type which rely on the well known Doppler effect for sensing the presence of a moving object in a space under surveillance. More particularly, this invention relates to methods and apparatus for substantially stabilizing the sensitivity of such devices and hence the range over which motion is detectable.

It is well known that if an area is irradiated with ultrasonic energy of a given frequency, that energy reflected from a moving object within said area will arrive at a nearby receiver having a frequency dependent upon the rate at which the distance between said object and receiver and/or source varies. In general, the energy reflected from a moving object will comprise only part of the total energy reflected back to a stationary receiver due to reflections from walls and other fixed objects within the irradiated space. In this case, the frequency and amplitude of the received energy will fluctuate with a period given by $\lambda/kv$ where $v$ is the moving object's velocity relative to the receiver, $\lambda$ is the wavelength of transmitted energy and $k$ is a constant which is equal to 2 when transmitter and receiver are located together. This phenomenon is known as the "Doppler effect" in recognition of its discoverer.

Heretofore, the Doppler effect has been employed quite successfully as the basis of operation of highly sensitive motion-detection devices. Typical of such devices are the currently popular ultrasonic intruder detection devices. Briefly, these devices sense intrusion by transmitting utrasonic energy into a confined region wherein intrusion is anticipated, and monitoring the return signal for changes in frequency (the Doppler frequency being the difference in frequency between the transmitted and received signal) or for changes in phase and/or amplitude which occur at the Doppler frequency rate. When no motion is present, the Doppler frequency is, of course, zero. When a Doppler frequency is detected, the Doppler signal is usually filtered to eliminate frequencies which are uncharacteristic of the type of motion of interest, integrated to avoid false-alarming due to electrical or acoustical transients, and then used to activate an alarm of some sort.

As indicated above, there are basically three methods of detecting the Doppler frequency; i.e., frequency, amplitude and phase detection. Although each method has certain advantages over the others, each has limitations under certain environmental conditions which render it less than optimum in the detection it affords.

For example, Doppler detection devices which function by sensing only changes in amplitude of the received signal are advantageous from the standpoint that it is the simplest detection scheme, requiring no circuitry for comparing the received and transmitted signals. However, such devices are often unreliable in sensing low level signals, such as produced by distant targets. In the absence of motion in the area under surveillance, reflected energy waves arrive at the detecting component at various amplitudes and phases relative to each other. Depending upon the degree of reinforcement (which depends upon such uncertain factors as atmospheric conditions, placement of stationary objects in the area under surveillance, frequency drifts in the transmitted energy wave, etc.), the peak-to-peak amplitude of the resultant signal can vary several orders of magnitude. To accommodate this range in signal level, it is common for conventional amplitude-sensing Doppler devices to employ non-linear amplifiers (commonly logarithmic) which compress dynamic range. In addition to the disadvantage of adding cost to the overall system, these amplifiers are disadvantageous from the standpoint that they inherently cause variable detector sensitivity. Since the non-linear amplifiers provide a higher gain to incremental changes in signal occurring at a low level than to incremental changes occurring at a high level, detector sensitivity (i.e., the maximum range at which motion is detectable) decreases as the composite signal level increases at the detector. For such devices to achieve a substantially constant sensitivity, regardless of signal level, a linear amplifier response is required. However, the use of linear amplifiers in such devices results in the inability to handle a large range of signal amplitudes. Hence, if the amplifiers gain is reduced to accommodate high signal levels, low signal levels go undetected. On the other hand, if the amplifier gain is increased to accommodate low level signals, strong background signals can produce amplifier saturation or clipping, in which case small amplitude changes, such as produced by distant targets, will go undetected.

In addition to the above-mentioned disadvantage, amplitude detecting Doppler devices, like their frequency and phase-detecting counterparts, exhibit a drastic reduction in sensitivity when subjected to a so-called "null condition." A null condition arises when the energy waves returning to the detector from the various reflecting surfaces in the protected area combine so as to substantially cancel. When such a condition arises, it is not uncommon for conventional systems to experience a reduction in range by as much as a factor of three. The major cause of this dramatic effect is that conventional devices incorporate diodes as a part of the detection component. In a null condition, there simply is insufficient signal available to overcome the forward diode drop in the detector; thus, for all practical purposes, the detector remains in a no-signal condition. While movement of an object in the protected area will act to destroy the null condition, the signal provided by a target is often quite small compared with the signal reflected by the total background. Thus, even movement of a target will not sufficiently destroy the null condition until the target is relatively close to the detector, at which time it produces a much stronger signal.

In addition to the null condition produced external to the Doppler device by destructively interfering waves arriving at the detector, another type of null condition can arise which is internal to the system. This second type of null condition affects reliability of Doppler devices of the phase and frequency detecting variety. Typically, an oscillator circuit is used to drive the transducer which emits the waves of energy through which motion is detected. The output of this circuit is commonly employed as a reference signal in the detecting component against which the frequency or phase of the received signal is compared. A condition of minimum sensitivity arises when the oscillator and detector signals are substantially in phase quadrature producing a substantial decrease in range. Since the phase difference between the compared signals is uncontrollable, depending on the aforementioned unpredictable conditions, the range and sensitivity cannot be predicted with any degree of certainty.

SUMMARY OF THE INVENTION

It is, therefore, an object of the present invention to provide an improved Doppler detection device which exhibits a relatively constant range and sensitivity, notwithstanding wide variations in the level of received signal.

Another object of this invention is to provide an improved Doppler detection device which comprises means for sensing the Doppler signal through both amplitude and phase changes in the received signal.

Another object of this invention is to provide a novel method for stabilizing the sensitivity of a Doppler detection device so as to render the sensitivity substantially independent of the geometric configuration of the area under surveillance, drifts in frequency of the transmitted energy waves, etc.

These and other objects of the invention are achieved by the provision of a Doppler detection device which employs a unique signal injection technique. According to the invention, a constant signal derived from an oscillator used to drive the transmitter is algebraically added to the output of the receiving transducer used to detect the reflected energy waves. The resultant signal is then fed to a class B or C amplifier which acts as a clamp with gain. The clamped signal is then filtered to remove the relatively high carrier frequency, leaving behind the Doppler signal. High gain amplification is then applied to the Doppler signal to make up for the gain dispensed with at the carrier frequency. Preferably, the peak-to-peak amplitude of the injected signal is slightly larger than the largest expected signal to which it is added so as to prevent a null condition from occurring at large signal conditions. Since the injected signal is present at all times, the detector always operates with sufficient signal to overcome the aforementioned diode dead-zones and full sensitivity is achieved even for very small signal changes which occur at or near null conditions. Since the injected signal is of the same order of magnitude as the largest expected return signal, very little dynamic range is required for the carrier amplifier. Because high gain amplifiers are not needed to amplify low signals at the carrier frequency, a very broad dynamic range is achieved at almost constant signal level, thus achieving substantially linear operation, a necessity for constant range and sensitivity. In addition to permitting the use of a low gain front end, the injected signal also serves as the reference against which the phase or frequency of the received signal can be compared to derive the Doppler signal. Since the magnitude of the algebraic sum of the received and injected signals is a function of both amplitude and phase or frequency changes in the received signal, the Doppler signal is obtained by two of the aforementioned methods of detection simultaneously. This is particularly advantageous since more information is available.

Other objects and advantages of the invention will become apparent from the ensuing detailed description of a preferred embodiment, reference being made to the accompanying drawings.

BRIEF DESCRIPTION OF THE DRAWINGS

FIG. 1 is a block diagram of a Doppler detection device embodying the present invention;

FIG. 2 is an electrical schematic illustrating preferred circuitry for implementing the invention; and FIG. 3a, 3b and 3c illustrate various waveforms representative of the signal at various test-points in the FIG. 2 circuit.

DETAILED DESCRIPTION OF PREFERRED EMBODIMENTS

In FIG. 1, a Doppler motion-detection device embodying the invention is shown in block diagram form. While the invention will be described with particular reference to an ultrasonic-type Doppler device, it is understood that the invention has equal utility in devices employing electromagnetic wave energy. The device can be best understood from the ensuing description of its operation.

Waves of ultrasonic energy emanating from a transmitter 10 are directed into a region wherein motion is to be detected. Transmitter 10 preferably comprises a piezoelectric ceramic transducer 11 which is driven at an ultrasonic frequency, preferably 40 KHz, by an oscillator 12 via driver amplifier 14. The exact frequency control afforded by the use of a crystal-controlled oscillator permits several Doppler devices to operate within the same general area without generating undesirable beat frequencies.

Ultrasonic energy waves reflected back toward the receiver 20 are sensed by receiver transducer 21, also ceramic, which converts the ultrasonic energy into an electrical signal having an instantaneous frequency, phase and amplitude characteristic identical to the resultant ultrasonic energy wave at the receiver transducer. Transducer 21 has a band-pass characteristic which, in combination with a tuned preamplifier 23 through which the output of transducer 21 is passed, causes the device to respond only to those signals centered within a few kilohertz of the transmitter frequency. Such "front end" tuning enables the device to ignore ordinary audible noises.

As long as there is no motion in the region under surveillance, the received signal level will be constant, except for slow drifts produced by changes in temperature and humidity which affect the speed of sound, and the frequency will be identical to that of the transmitted energy wave. However, in the event an object within said region moves so as to have a component of motion toward or away from the receiver, sound waves reflected from it will fluctuate in both amplitude and frequency which, in turn, will produce similar fluctuations in the output of transducer 21.

Amplitude changes in the output of preamplifier 23 are sensed by detector amplifier 25 which is biased such that there is more gain for excursions of one polarity than for equal excursions of the opposite polarity. This non-linear operation, together with some built-in capacitance, serves as an envelope detector with gain; the envelope frequency being, of course, equivalent to the Doppler frequency.

In addition to sensing the Doppler frequency via amplitude changes in the received signal, the Doppler frequency is also sensed via the signal injection technique of the invention. Prior to being fed to the input of detector amplifier 25, the output of preamplifier 23 is combined with a large constant amplitude signal of the transmitter frequency which is injected from the output of driver amplifier 14. Actually, the injected signal is algebraically summed with the preamplifier output via summer 27. When the injected signal and received signal are in phase, they reinforce each other producing an increase in the output from summer 27. When the injected and received signals are out of phase, a decrease in the summer output is produced. This amplitude variation, arising from frequency or phase shifts generated by a moving target, is also detected by detector amplifier 25 which contains a low pass filter which removes the 40 KHz carrier frequency, leaving only a signal which fluctuates at a rate equal to target-related Doppler amplitude and frequency changes.

While serving as a reference against which the frequency (or phase) of the received signal is compared for the purpose of detecting the Doppler signal, injection also serves to stabilize the sensitivity of the Doppler device. Preferably, the injected signal is larger than the maximum anticipated output of tuned preamplifier 23. Because of this, the amplitude of the carrier signal remains relatively constant even though there is considerable variation in received energy at the receiver transducer due to phase cancellations. This tends to maintain constant sensitivity notwithstanding device placement and substantial changes in environmental conditions. When a null condition exists and the output of the receiver transducer is substantially zero, the injected signal serves to overcome forward diode-drop in the detector. The injected signal, therefore, provides a bias to maintain the detector at uniform sensitivity.

The Doppler signal output of detector amplifier 25 is next fed to the Doppler signal amplifier 29 which comprises a conventional high-gain audio amplifier preferably having a bandwidth encompassing the Doppler frequencies of interest. The gain of amplifier 29 is sufficient to produce an overdriven "squared" signal for targets within the sensitivity range of the device. The output of amplifier 29 is then fed to a filter 31, preferably a digital filter circuit such as that disclosed in U.S. Ser. No. 20,887, filed Mar. 19, 1970, now U.S. Pat. No. 3,681,745, to further eliminate signals uncharacteristic of the motion of interest. After integration of the filter output by integrator 33 to eliminate the effects of transients, the signal is then used to trip an alarm relay 35 or the like.

Referring now to FIG. 2 wherein a preferred circuit for tuned amplifier 23, summer 25 and detector amplifier 27 is shown schematically, the output of receiver transducer 21 is A.C. coupled to the base of transistor Q1 via capacitor C1. Transistor Q1, together with resistor R1, potentiometer P1, capacitor C2 and coil L1 comprise tuned amplifier 23. Resistor R1 serves as a bias return resistor. Potentiometer P1 serves to control the amplifier gain, thereby serving as a range control, and capacitor C2 and coil L1 act as a tuned circuit to precisely match the amplifier frequency response to the frequency of the transmitted wave (i.e., 40 KHz). The output of transistor Q1 is summed with the injected signal from oscillator 12 at point A, the injected signal being fed to point A through resistor R2. The latter prevents loading of the tuned circuit by oscillator 12.

The algebraic sum of the injected signal and the output of transistor Q1 is A.C. coupled via capacitor C3 to the base of transistor Q2 which comprises detector amplifier 25. Assuming there is no output from transistor Q1, such as results from a perfect null at the receiver transducer, the injected signal provided via resistor R2 is large enough to turn on transistor Q2 during every positive peak. The base and collector voltage waveforms of transistor Q2 are shown in FIG. 3. In order to clarify circuit operation, these waveforms are drawn for the case where C4 is disconnected. It should be noted that the values of resistors R3 and R4 are chosen such that transistor Q2 is operating with little or no bias; i.e., in a class B or C bias mode. It is held below cut-off, on the average, by the action of capacitor C3 and the emitter-base diode of transistor Q2 (refer to FIG. 3a). Thus, conduction occurs for only a small fraction of each cycle at the peaks of the 40 KHz signal.

When there is an output from the tuned preamplifier, it adds algebraically to the injected signal, causing amplitude variation of two types. First, any amplitude fluctuations in the received signal are present in the linear sum signal. Second, if the amplitude of the received signal is constant but the frequency thereof changes above and below the carrier frequency, the sum signal will vary in amplitude due to varying degrees of reinforcement. Thus, frequency variations are converted into corresponding amplitude fluctuations. This ia type of FM demodulation.

As shown in FIG. 3b, the output of transistor Q2 is clamped to supply voltage V+ and has negative-going peaks which vary at the Doppler frequency. On a compressed time scale, the output of transistor Q3 is similar to that depicted in FIG. 3c. Capacitor C4 serves to filter out the high frequency component (i.e., the 40 KHz) of the detector amplifier, leaving behind the relatively low modulation frequency (i.e., the Doppler frequency). It should be noted that if detector amplifier 25 were operated in the conventional manner in a class A bias mode, the output would be substantially symmetrical and the subsequent filtering provided by capacitor C4 would result in a constant, zero signal.

The advantage of feedback bias via R4 and R5 is to make the input impedance of Q2 more nearly constant and independent of transistor gain. This is important because it is desirable to attenuate the very large low frequency signals characteristic of air turbulence and beats between two or more crystal controlled ultrasonic units. This attenuation is partially accomplished by C3 whose impedance, relative to the input impedance of Q2, helps determine the overall low frequency response of the ultrasonic receiver. It is necessary to attenuate low frequency signals not because of any false alarm problem (the succeeding digital filter handles that), but because large low frequency signals can block up the following stages making it impossible to detect small target signals mixed with them.

Note, in the circuit described above, that transistor Q2, in addition to separating the small modulation signal from its 40 KHz carrier, also has considerable gain thereby adding to the economy of the device.

While the invention has been described with particular reference to a preferred embodiment, it is understood that various modifications can be effected without departing from the spirit and scope of the invention as defined by the appended claims.

What is claimed as my invention is:

1. An acoustic motion-detecting device comprising:

means for transmitting acoustic energy waves of predefined frequency into a region wherein motion is to be detected, said transmitting means comprising means for generating a first electrical signal having a frequency proportional to said predefined frequency;

means for receiving said transmitted acoustic energy waves upon being reflected and/or modified by objects within said region, said receiving means comprising acusto-electrical transducing means for converting the acoustic energy waves received by said receiving means into a second electrical signal having a frequency, phase and amplitude proportional to the algebraic sum of all energy waves arriving at said receiving means, said frequency phase and amplitude being proportional to the rate of motion of objects in said region;

summing means electrically coupled to said generating means and said acousto-electrical transducing means for linearly adding said first and second electrical signals to provide a summed signal; and means, operatively coupled to said summing means, for converting said summed signal to an analog signal having a frequency proportional to the instantaneous difference in frequency between said first and second electrical signals and proportional to the rate at which the amplitude and/or phase of said second signal varies.

2. The invention according to claim 1 further comprising means for activating an indicator when the frequency of said analog signal is within a predefined frequency range.

3. The invention according to claim 1 wherein said converting means comprises an envelope detector which linearly detects amplitude variations of said summed signal.

4. The invention according to claim 3 wherein said envelope detector comprises a nonlinear amplifier biased in a Class B or Class C mode.

5. The invention according to claim 1 wherein said first electrical signal has a peak-to-peak amplitude substantially equal to or larger than the maximum peak-to-peak amplitude of said second electrical signal.

6. A method for detecting motion comprising transmitting acoustic energy waves of predefined frequency into a region wherein intrusion is anticipated;

deriving a first electrical signal having a substantially constant amplitude and a frequency proportional to said predefined frequency;

deriving a second electrical signal having a frequency and amplitude proportional to said transmitted energy waves upon being reflected and/or modified by objects in said region;

summing said first and second electrical signals to provide a summed signal; and deriving an analog signal from said summed signal having a frequency proportional to the difference in frequency between said first and second electrical signals and proportional to the rate of change in amplitude of said received signal.

7. The invention according to claim 5 further comprising the step of activating and indicator when the frequency of said analog signal is within a predefined frequency range.

* * * * *